(12) United States Patent
Ranganathan et al.

(10) Patent No.: US 11,965,399 B2
(45) Date of Patent: Apr. 23, 2024

(54) AUTOMATICALLY DETECTING AND CORRECTING ANOMALIES IN LOG DATA

(71) Applicant: GEOSOFTWARE C.V., The Hague (NL)

(72) Inventors: Chiranjith Ranganathan, Houston, TX (US); Joe Johnston, Guisely (GB); Frederick Jenson, Houston, TX (US)

(73) Assignee: GEOSOFTWARE C.V., The Hague (NL)

( * ) Notice: Subject to any disclaimer, the term of this patent is extended or adjusted under 35 U.S.C. 154(b) by 535 days.

(21) Appl. No.: 17/265,589

(22) PCT Filed: Dec. 28, 2018

(86) PCT No.: PCT/IB2018/001615
§ 371 (c)(1),
(2) Date: Feb. 3, 2021

(87) PCT Pub. No.: WO2020/065365
PCT Pub. Date: Apr. 2, 2020

(65) Prior Publication Data
US 2021/0301655 A1 Sep. 30, 2021

Related U.S. Application Data

(60) Provisional application No. 62/749,345, filed on Oct. 23, 2018, provisional application No. 62/736,059, filed on Sep. 25, 2018.

(51) Int. Cl.
*E21B 41/00* (2006.01)
*E21B 49/00* (2006.01)
*G01V 11/00* (2006.01)

(52) U.S. Cl.
CPC .............. *E21B 41/00* (2013.01); *G01V 11/00* (2013.01); *E21B 49/00* (2013.01); *E21B 2200/20* (2020.05)

(58) Field of Classification Search
CPC ...... E21B 41/00; E21B 49/00; E21B 2200/20; E21B 2200/00; E21B 47/00; G01V 11/00
See application file for complete search history.

(56) References Cited

U.S. PATENT DOCUMENTS 3,838,279 A 9/1974 Schultz et al.
4,758,956 A * 7/1988 Duffy ..................... G01V 1/288
702/10

(Continued)

FOREIGN PATENT DOCUMENTS

WO 2014055931 A1 4/2014
WO 2017135972 A1 8/2017
WO 2018125760 A1 7/2018

OTHER PUBLICATIONS

T. Soni Madhulatha, "An overview on clustering methods", 2012, IOSR Journal of Engineering, vol. 2(4) pp. 719-725 (Year: 2012).*

(Continued)

*Primary Examiner* — Mohamed Charioui
(74) *Attorney, Agent, or Firm* — PATENT PORTFOLIO

(57) ABSTRACT

A geological exploration method starts by obtaining measurements and calculating properties along boreholes in an area of interest to generate log data including plural curves. Anomalies are detected along at least one curve of one of the boreholes. A machine learning regressor is trained using one or more curves without anomaly values of the one of the boreholes and/or of another similar borehole among the boreholes, to predict a synthetic curve corresponding to the at least one curve. The synthetic curve is then blended into the at least one curve.

20 Claims, 12 Drawing Sheets

(56) References Cited

U.S. PATENT DOCUMENTS

| | | | |
|---|---|---|---|
| 4,916,616 | A | 4/1990 | Freedman et al. |
| 5,828,981 | A * | 10/1998 | Callender .............. G01V 11/00 |
| | | | 702/6 |
| 7,227,355 | B2 | 6/2007 | Chen et al. |
| 8,136,395 | B2 | 3/2012 | Pop et al. |
| 8,219,319 | B2 | 7/2012 | Skelt |
| 9,229,127 | B2 | 1/2016 | Leseur |
| 9,970,266 | B2 | 5/2018 | Marx et al. |
| 2004/0133531 | A1* | 7/2004 | Chen ........................ G06N 3/08 |
| | | | 706/46 |
| 2013/0341093 | A1 | 12/2013 | Jardine et al. |
| 2016/0053604 | A1 | 2/2016 | Abbassian et al. |
| 2018/0031732 | A1 | 2/2018 | Mosse et al. |
| 2018/0038992 | A1 | 2/2018 | Macdonald et al. |
| 2018/0202264 | A1* | 7/2018 | Sarduy .................... G06N 20/00 |

OTHER PUBLICATIONS

Azimi et al., "Anomaly Detection and Reliability Analysis of Groundwater by Crude Monte Carlo and Importance Sampling Approaches", Aug. 29, 2018, Springer, 24 pages. (Year: 2018).*

Liu et al., "Isolation-Based Anomaly Detection", Mar. 2012, ACM Transactions on Knowledge Discovery from Data, vol. 6, No. 1, Article 3, (Year: 2012).*

Wang et al., "Robust High-dimensional Bioinformatics Data Streams Mining by ODR-ioVFDT", Feb. 23, 2017, Scientific Reports | 7:43167 | DOI: 10.1038/srep43167, pp. 1-12 (Year: 2017).*

International Search Report / Written Opinion dated Jun. 24, 2019 in related/corresponding PCT Application No. PCT/IB2018/001615.

Mithilseh Kumar et al., Petrophysical evaluation of well log data and rock physics modeling for characterization of Eocene reservoir in Chandmari oil field of Assam-Arakan basin, India, Journal of Petroleum Exploration and Production Technology, Jun. 1, 2018, pp. 323-340, vol. 8, No. 2.

P. M. Wong et al., "A Pattern Adaptive Technique to Handle Data Quality Variation," Neural Processing Letters, Aug. 1, 1999, pp. 7-15, vol. 10, No. 1.

Ridvan Akkurt et al., Accelerating and Enhancing Petrophysical Analysis with Machine Learning: A Case Study of an Automated System for Well Log Outlier Detection and Reconstruction, Society of Petrophysicists and Well Log Analysts (SPWLA) 59th Annual Logging Symposium, Jun. 2-6, 2018, pp. 1-25.

Office Action in related/corresponding Brazilian Patent Application No. 112021001030-0 dated Nov. 1, 2023, including partial English translation.

* cited by examiner

Before correction

After correction

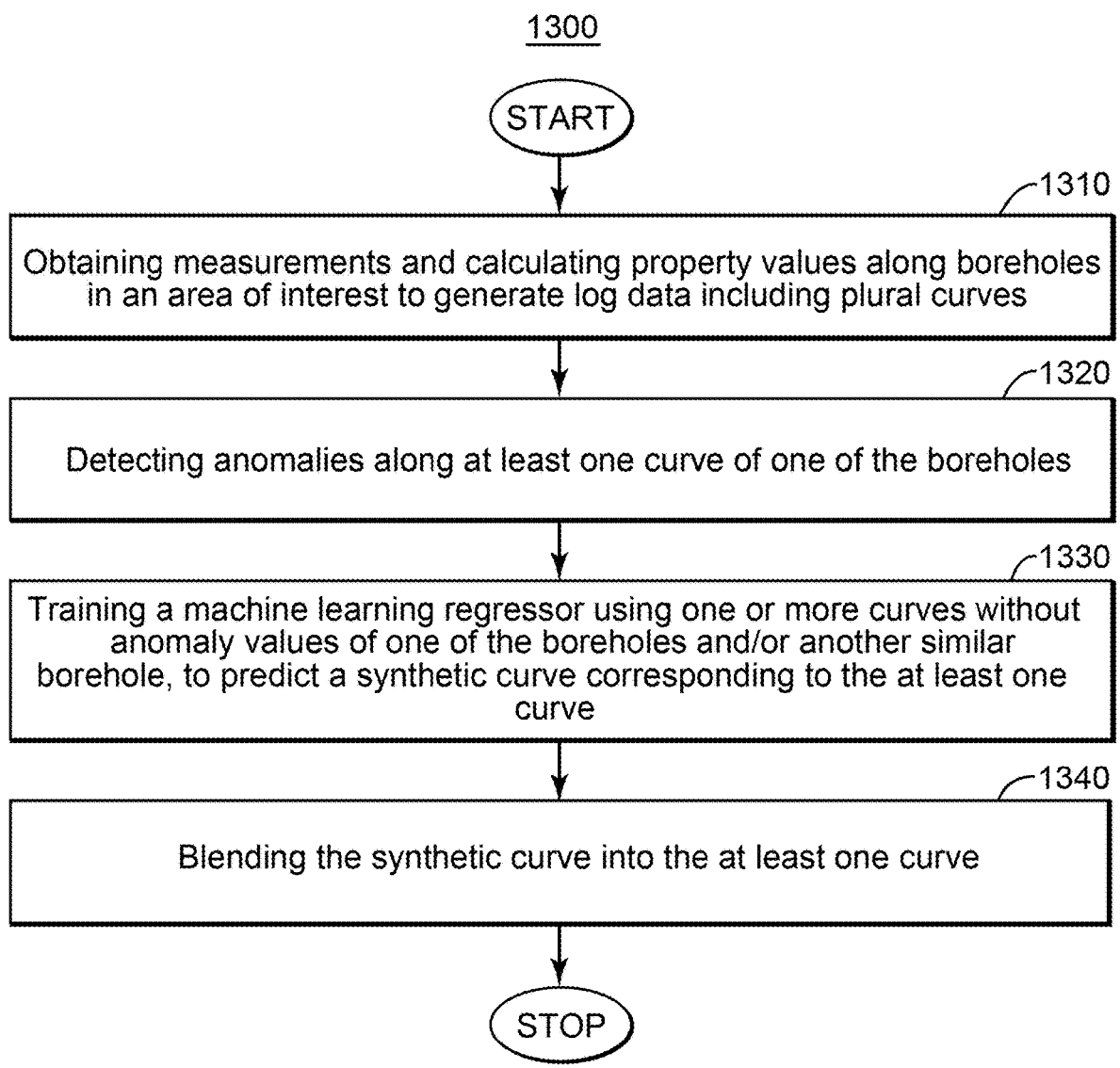

AUTOMATICALLY DETECTING AND CORRECTING ANOMALIES IN LOG DATA

BACKGROUND

Technical Field

Embodiments of the subject matter disclosed herein generally relate to methods and systems for geological exploration based on values of measurements acquired with logging tools and of properties calculated from the measurements along a borehole, and, in particular, to methods and systems for automatically detecting and correcting anomalies in the log data.

Discussion of the Background

Probing underground formations in search of hydrocarbon resources is an ongoing process driven by continually increasing worldwide demand. Log data includes various measurements associated with positions along a drilled hole. The measurements include plural quantities such as gamma ray, spontaneous potential, hole dimensions, resistivity (shallow or deep), density, neutron porosity, sonic impedance, photoelectric, etc. Log data also includes petrophysical properties (such as shale volume, water saturation, porosity, permeability, elasticity, reflectivity coefficient, etc.) values are derived from the measurements. "Log" or "curve" are terms used for a set of values representing same feature measured or calculated at locations (depths) along a drilled hole. The term "borehole" is used while a hole is drilled in the Earth, and the term "well" is used when drilling has been completed and, for example, hydrocarbons or other minerals are extracted. However, in this document, the terms "borehole" and "well" may be used interchangeably.

Once log data becomes available, an accurate petrophysical analysis thereof includes detection and correction of anomalies. An anomaly in the recorded log data is a measurement or set of measurements that do not conform to the expected tool response in the borehole. This could be caused, for example, by enlarged borehole or erratic borehole wall shape (rugosity) and is a bad hole point. Note that presence of an anomaly is signaled by an outlier value.

In an attempt to accelerate the petrophysical analysis, outlier value detection has been automated as described in the article, "Accelerating and Enhancing Petrophysical Analysis with Machine Learning: A Case Study of An Automated System for Well Log Outlier Detection and Reconstruction," by R. Akkurt et al., presented at the Society of Petrophysicists and Well Log Analysts (SPWLA) 59th Annual Logging Symposium, Jun. 2-6, 2018. The machine learning, ML, workflow set forth in this article includes: (1) exploratory data analysis, (2) outlier identification, (3) well grouping based on similarity, (4) reconstruction based on prediction and (5) quality assessment.

This first attempt has some weaknesses impacting the quality of the results, such as (but not limited to) the absence of reconstructing values for detected anomalies (i.e., replacing the outlier values), as well as patching curves at outlier depths and ignoring the outlier points in the similarity analysis. Additionally, Akkurt's approach employs only a few of the available logs.

Thus, there is a need to develop methods and systems that overcome the above-described drawbacks and limitations in automatic anomaly detection and correction of log data.

SUMMARY

Methods and devices according to various embodiments provide automatic anomaly detection and correction for log data.

According to an embodiment there is a geological exploration method that includes obtaining measurements and calculating property values along boreholes in an area of interest to generate log data including plural curves, detecting anomalies along at least one curve of one of the boreholes, and training a machine learning regressor using one or more curves without anomaly values of the one of the boreholes and/or of another similar borehole among the boreholes, to predict a synthetic curve corresponding to the at least one curve. The method further includes blending the synthetic curve into the at least one curve. Here, a curve is a set of measurements or calculated property values associated with depth values.

According to another embodiment there is an underground exploration apparatus having an interface configured to obtain measurements and calculating property values along boreholes in an area of interest to generate log data including plural curves and a data processing module connected to the interface, including at least one processor. The data processing module is configured to detect anomalies along at least one curve of one of the boreholes, to train a machine learning regressor using one or more curves without anomaly values of the one of the boreholes and/or of another similar borehole among the boreholes, to predict a synthetic curve corresponding to the at least one curve, and to blend the synthetic curve into the at least one curve.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 13 is a flowchart of a geological exploration method according to an embodiment.

DETAILED DESCRIPTION

The following description of the exemplary embodiments refers to the accompanying drawings. The same reference numbers in different drawings identify the same or similar elements. The following detailed description does not limit the invention. Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places is not necessarily referring to the same embodiment. Further, the particular features, structures or characteristics may be combined in any suitable manner in one or more embodiments.

Figure 1:
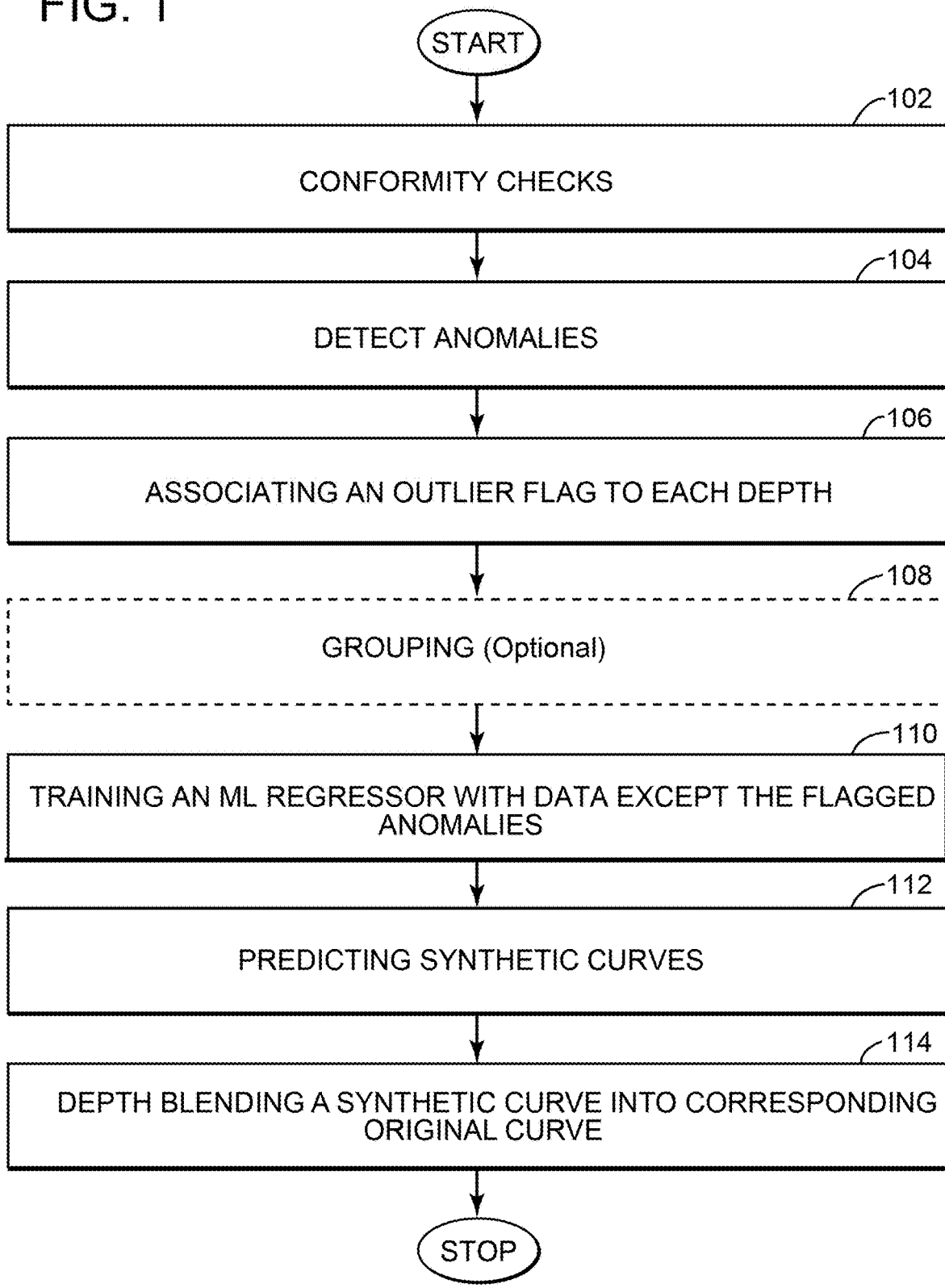
FIG. 1 is a schematic illustration of a workflow for anomaly detection and correction according to an embodiment.

FIG. 1 is a schematic illustration of a workflow for anomaly detection and correction according to an embodiment. Outliers are observations that deviate from an overall pattern. In the process of producing, collecting, processing and analyzing data, outliers may be due to errors. Outliers that are not a product of an error are sometimes called "novelties."

The workflow illustrated in FIG. 1 starts with a conformity check at 102. This conformity check includes verifying that the basic logs (resistivity, density, neutron, gamma ray, etc.) exist, depth-shifting so that each log is at the same depth relative to the other logs of the same borehole, normalizing the log(s) so that the response range of one log in a borehole is similar to the same log in other boreholes, applying environmental corrections for temperature, borehole conditions, etc., if needed.

Then, at 104, the depths at which anomalies occur are identified. In order to perform this step, candidate curves for anomaly detection and correction are selected first. For example, density, neutron and sonic curve may be selected as they are the most sensitive to anomalous responses. Anomaly detection may be performed using an isolation forest method and/or a density-based clustering method (DBScan) described later in this document and illustrated in FIG. 2. Using the Anomaly detection ensemble is preferred as ensembles are more reliable than a single algorithm's results. Uncorrected neutron porosity and density curves are used in one embodiment. Differential caliper log or first derivative of caliper log may also be employed. Caliper log is a series of measurements of the borehole's diameter and shape. The caliper is a tool with 2, 4 or more (up to 30) expandable arms that measures the borehole's geometry.

At 106, the anomaly detection's results are converted into a flag log associating an anomaly flag value to each depth. Anomaly flag values could be 0 or 1 and they may be associated with a log of the same quantity in each borehole that was analyzed for anomalies. An embodiment of this step is described later in this document and illustrated in FIG. 3.

Then, at 108, grouping based on well similarity analysis is performed to visualize results on a hierarchical cluster from a confusion matrix (see, e.g., FIG. 7) showing the different similarity scores. Wells with high similarity scores are grouped together. An embodiment of this step is described later in this document and illustrated in FIG. 4.

Training a machine learning, ML, regressor with data from inlier depths of (similar wells) leaving out anomalies is then performed at 110. Logs that are less affected by bad values (for example, gamma ray, sonic, resistivity) are used for training, which is then used to predict logs that require corrections such as neutron porosity, density. The ML regressor could be a neural network, a multilinear regressor, a support vector machine, a random forest regressor or a gradient boosting regressor.

At 112, synthetic curves are then predicted using the trained ML regressor for neutron porosity, density and other logs that require correction, from the trained data across all depths on the same group of boreholes.

Then, at 114, depth-blending is performed for each log that requires correction and had a synthetic log generated at 112. For example, the synthetic curve is blended into the original curve by replacing original values at depths flagged as anomalies with synthetic curve values. Other blending techniques are presented in FIG. 8. FIGS. 9A and 9B illustrate neutron porosity versus density log values before and after applying corrections.

Figure 2:
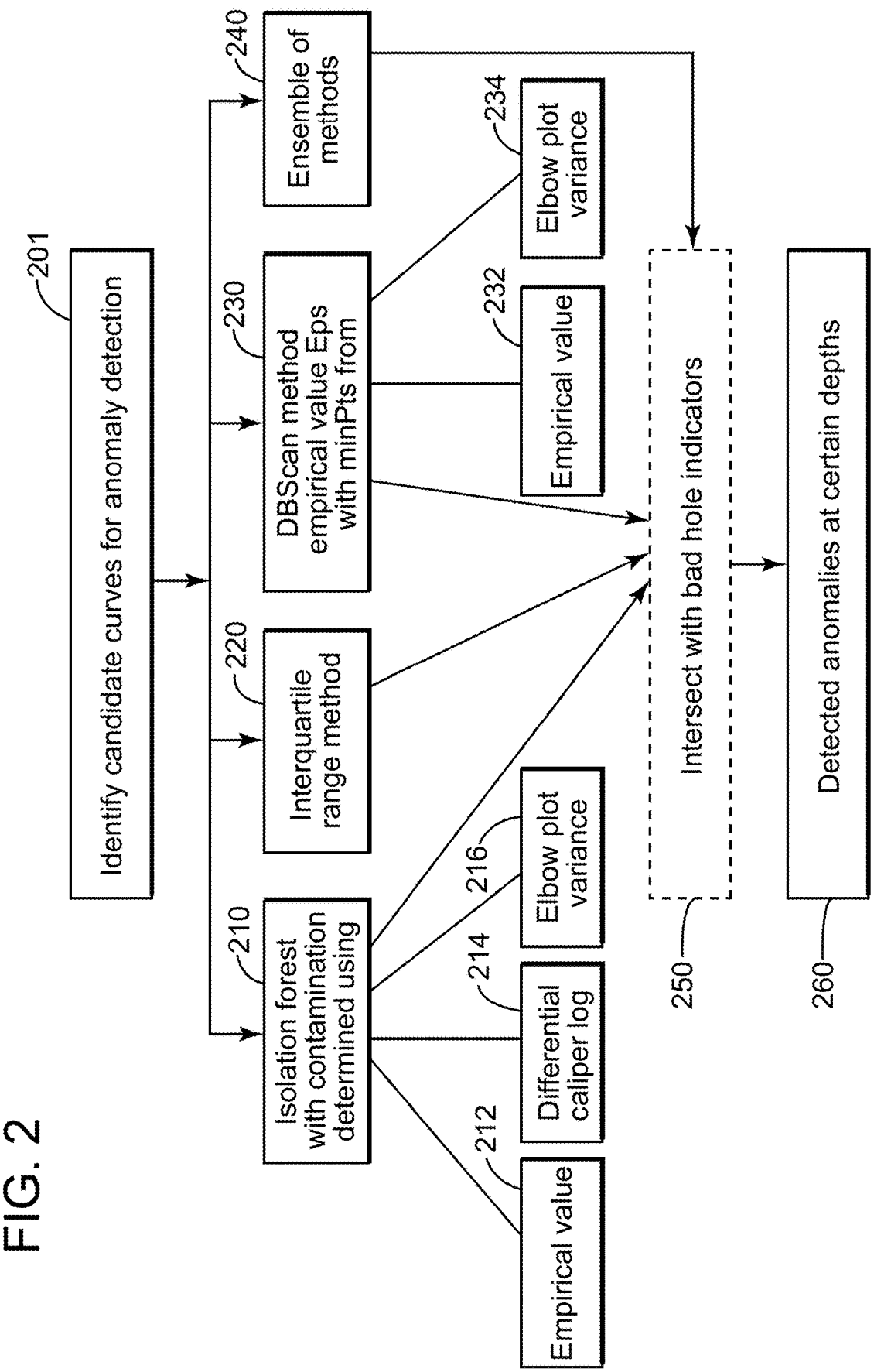
FIG. 2 illustrates implementations of anomaly detection, according to some embodiments.

FIG. 2 details alternative implementations of anomaly detection (i.e., step 104 in FIG. 1) according to some embodiments. First, at 201, logs to be used for anomaly detection are selected. For example, in one embodiment, neutron porosity and bulk density are used. Other embodiments may use combinations of any basic logs (including caliper or differential caliper).

Then, an isolation forest algorithm 203 or a density-based spatial clustering algorithm (DBScan) 211 may be used to detect the anomalies. The anomaly detection methods can be executed independently and combined as an ensemble. The outcome of a method in the ensemble or the outcome of a combination of methods may then be used. Additionally, an interquartile range (IQR) fencing based outlier detection may be applied on a bad hole indicator log like differential caliper or bulk density as a part of the ensemble.

Isolation forest is an effective method for detecting outliers in data based on binary decision trees. The premise is that outliers are few and far from the rest of the observations. To build a tree (training), the algorithm randomly picks a feature from the feature space and a random split value ranging between the feature's maximum and minimum values. This is performed for all the observations in the training set. To build the forest, a tree ensemble is made by averaging all the trees in the forest. Then for prediction, an observation is compared with the splitting value in a "node", yielding two node children on which another random comparison is made. The number of "splittings" made by the algorithm for an instance is named "path length." As expected, outliers have shorter path lengths than the other observations.

An outlier score $s(x,n)$ computed for each observation is a function of the path length x of the sample and the number n of external nodes. After calculating a score ranging from 0 to 1 (1 meaning more outlyingness and 0 meaning more normality) for each observation, the score is compared with a threshold known as "contamination."

The isolation forest algorithm requires a value for contamination at 203. There are three options to estimate contamination. A first option 205 is to use an empirical value such as 0.1. A second option 207 calculates an upper and a lower fence of the differential caliper log, and then determines contamination as the percentage of points outside the upper and the lower fence. For example, upper fence=p75+1.5×IQR and lower fence=p25−1.5×IQR, where IQR is interquartile range, which is typically p75−p25, p75 being the 75th percentile and p25 being the 25th percentile. Alternatively or additionally, a caliper derivative or log quantity such as bulk density or density correction may be used as these are also sensitive to bad hole effects.

Figure 3:
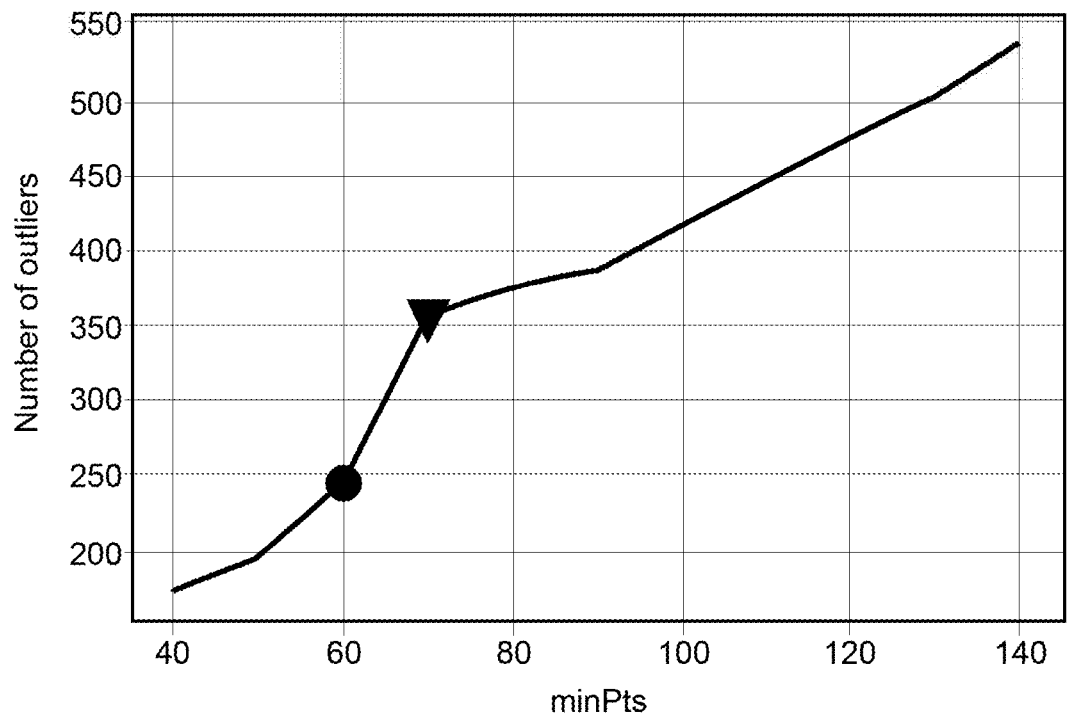
FIG. 3 is a graph illustrating elbow-plot variance method for automatic parameter determination.

A third option 209 automatically calculates an ideal contamination value using an elbow-plot variance method applied to a plot of number of points marked as anomalies versus contamination (similar to the plot illustrated in FIG. 3 but with contamination values on x-axis). The contamination value is varied, for example, within a range of 0.05 to 0.3 at a step example 0.01 or 0.02, and the number of points marked as anomalies for each contamination value is recorded. The contamination value which has the highest variance or rate of change of the number points marked as anomalies is chosen as the ideal contamination value. This value can be adjusted (e.g., increased or decreased one or a few steps) to achieve best results.

Alternatively or additionally to using isolation forest, a density-based spatial clustering method (DBScan) may also be employed as suggested by the box labeled 211. DBscan is focused on finding neighbors by density (MinPts) on an 'n-dimensional sphere' with radius eps. A cluster can be defined as the maximal set of 'density connected points' in the feature space. In DBscan, a data point is a core point if its neighborhood (defined by eps) contains at least the same number or more points than the parameter minPts, a border point is still 'density reachable' (or 'density connected') by other points in the cluster as it lies in a cluster, but its neighborhood does not contain more points than minPts, and an outlier is a point that lies in no cluster and is not 'density reachable' by any other point (in other words, an outlier is alone in its own cluster). Thus, eps is the maximum distance between two given samples to consider them neighbors, and minPts is the number of surrounding samples for a given point to be considered a core point.

As indicated at 213, an empirical value may be used for eps. Then, one option 217 is to use an empirical value for minPts. Another option 215 is to use an automatic elbow-plot variance method (see FIG. 3). The minPts is varied within a range example: 50 to 300 (the range may be an empirical percentage of total number of depths) at a step of 5 or 10. The number of points marked as anomalies for each minPts value is recorded. The value of minPts which has the highest variance or rate of change of the number of points marked as anomalies is chosen as the ideal value. This minPts value can be adjusted by increasing or decreasing it with one step to achieve best results. The elbow occurs because at a certain minPts value, the algorithm is no longer just marking outliers but marking entire clusters as outliers. This transition point can thus be automatically identified and it is used as the ideal value for minPts for that borehole log.

An ensemble technique 221 may be employed to combine (as an intersection or a union) anomaly detection results obtained with the isolation forest and the ones obtained using DBScan. Additionally, the results of an interquartile range (IQR) fencing on one of the bad hole indicator logs such as differential caliper or bulk density could be intersected to the results of anomaly detection at 223. The output is the detected anomalies 215.

Figure 4:
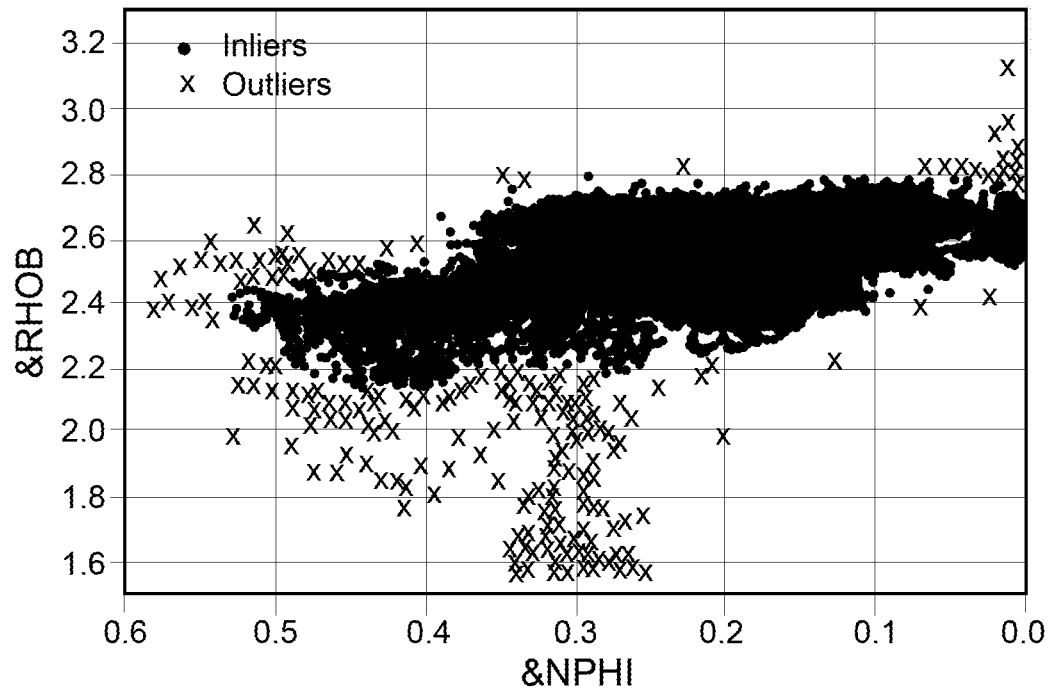
FIG. 4 shows outliers and inliers identified using the results in FIG. 3.

As already mentioned, FIG. 3 is a graph illustrating variance-based automatic minPts ideal value determination. FIG. 4 shows marked outliers (lighter circles) identified using the results shown in FIG. 3 with DBScan and inliers (darker circles).

Figure 5:
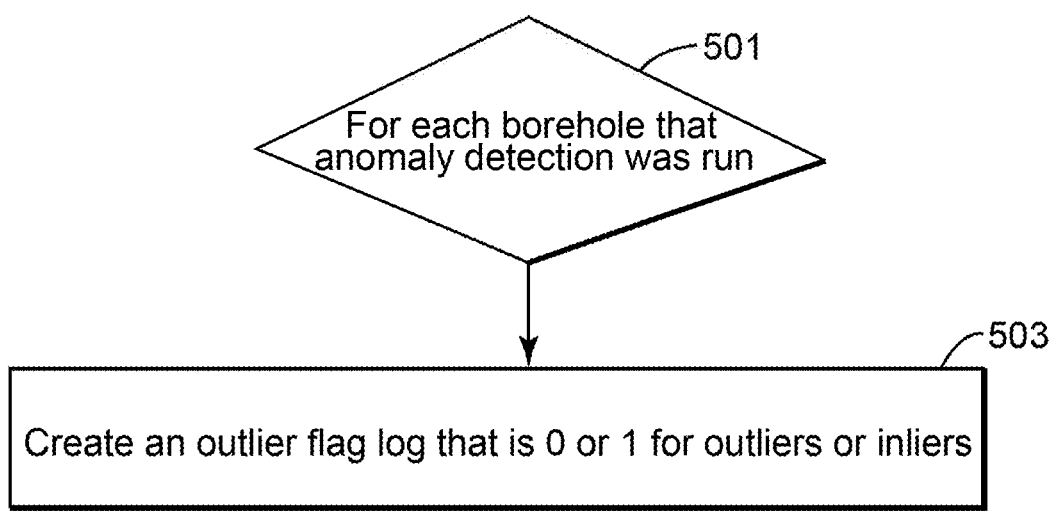
FIG. 5 illustrates an implementation of the step of associating an anomaly flag to each depth according to an embodiment.

FIG. 5 illustrates an implementation of associating an anomaly flag to each depth (i.e., step 106 in FIG. 1). While looping over all boreholes on which anomaly detection was run at 501, a flag value is associated with each depth at 503. The flag can have value 0 or 1 (depending on whether an anomaly was detected at the depth or not), and the values constitute a log for the analyzed borehole.

Figure 6:
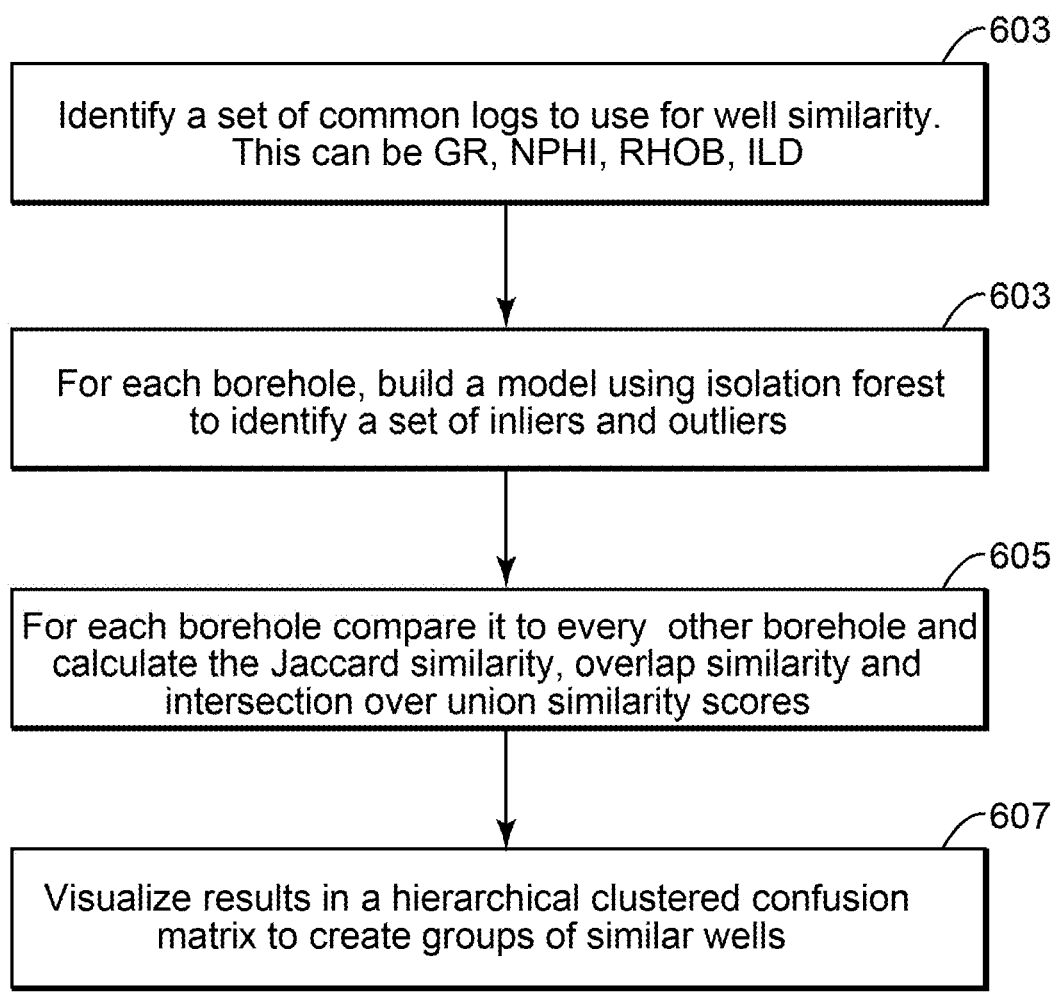
FIG. 6 illustrates an embodiment of borehole grouping.

FIG. 6 illustrates an embodiment of the borehole grouping (i.e., step 108 in FIG. 1). At 601, a set of common logs to be used for determining well similarity are selected. For example, the set may include Gamma Ray (GR), Neutron Porosity (NPHI), Bulk Density (RHOB), resistivity (e.g., Deep Induction ILD). It is recommended but not required to include logs that require correction.

At 603, a model is built for each borehole using the inliers established via an isolation forest method. Then, at 605, each borehole is compared to every other borehole to calculate the Jaccard similarity score, the overlap similarity score and/or the intersection-over-union score. Jaccard similarity score measures similarity for the two sets of data with a range from 0% to 100%; the higher the percentage, the more similar the two data sets. Overlap similarity score measures the overlap between two data sets being defined as the size of the intersection divided by the smaller of the size of the two sets. The intersection-over-union score is 0.5 when a data set is compared with itself. If the two data sets have the same size, the overlap score may also be expressed in terms of percentage.

In one embodiment, comparing two boreholes, Borehole1 and Borehole2, with model1 and model2, respectively, includes:
 1. Pass the candidate log values of Borehole1 through model1 and model2 and, similarly, values of Borehole2 through model1 and model2 to determine points (depths) that are inliers in both wells, points that are inliers in Borehole1 alone, and points that are inliers in Borehole2 alone.
 2. Use the above determination to calculate the Jaccard similarity score and/or the overlap similarity score.

Figure 7:
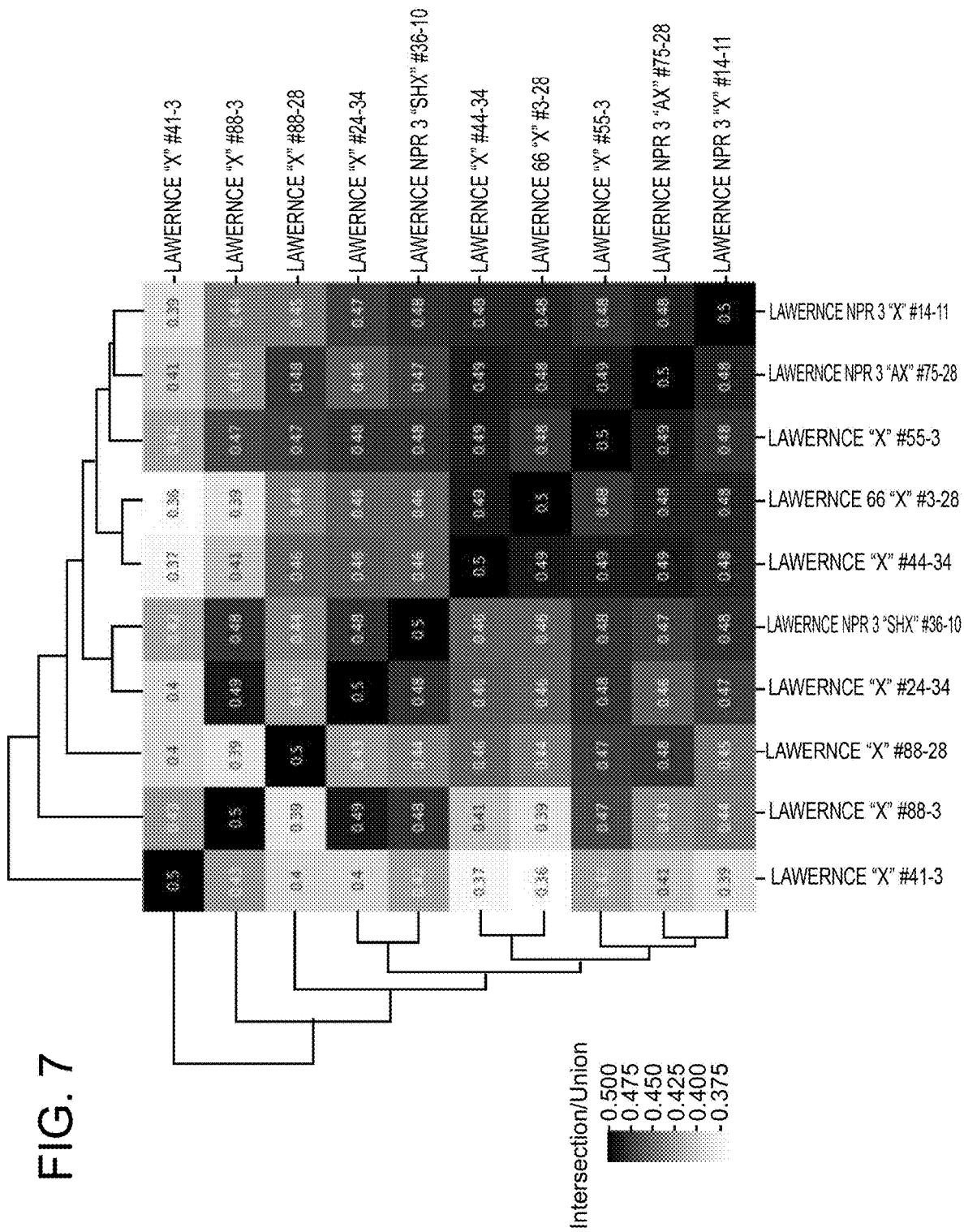
FIG. 7 is an example of similarity analysis.

Results are visualized in a hierarchical clustered confusion matrix at 607, thus, allowing quicker identification of similar wells to create groups. FIG. 7 is an example of similarity analysis using the intersection-over-union score on a group of wells. The labels on the right side and bottom of the table identify wells in an area of interest. The connector lines on the top and left sides show the hierarchical grouping based on similarity.

Figure 8:
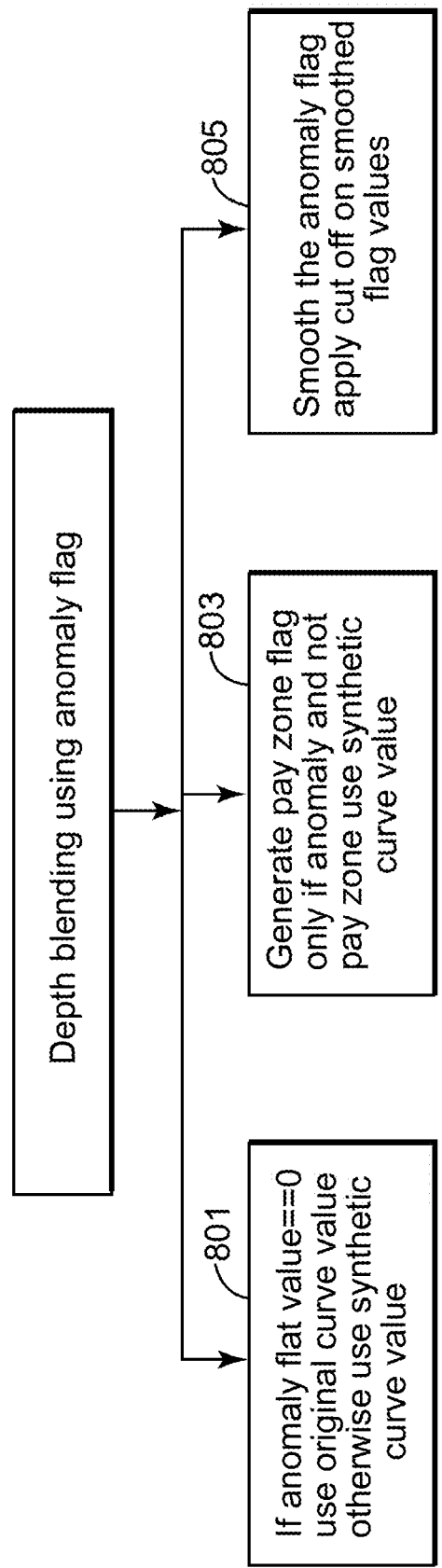
FIG. 8 illustrates implementations of depth-blending.
Figure 9A:
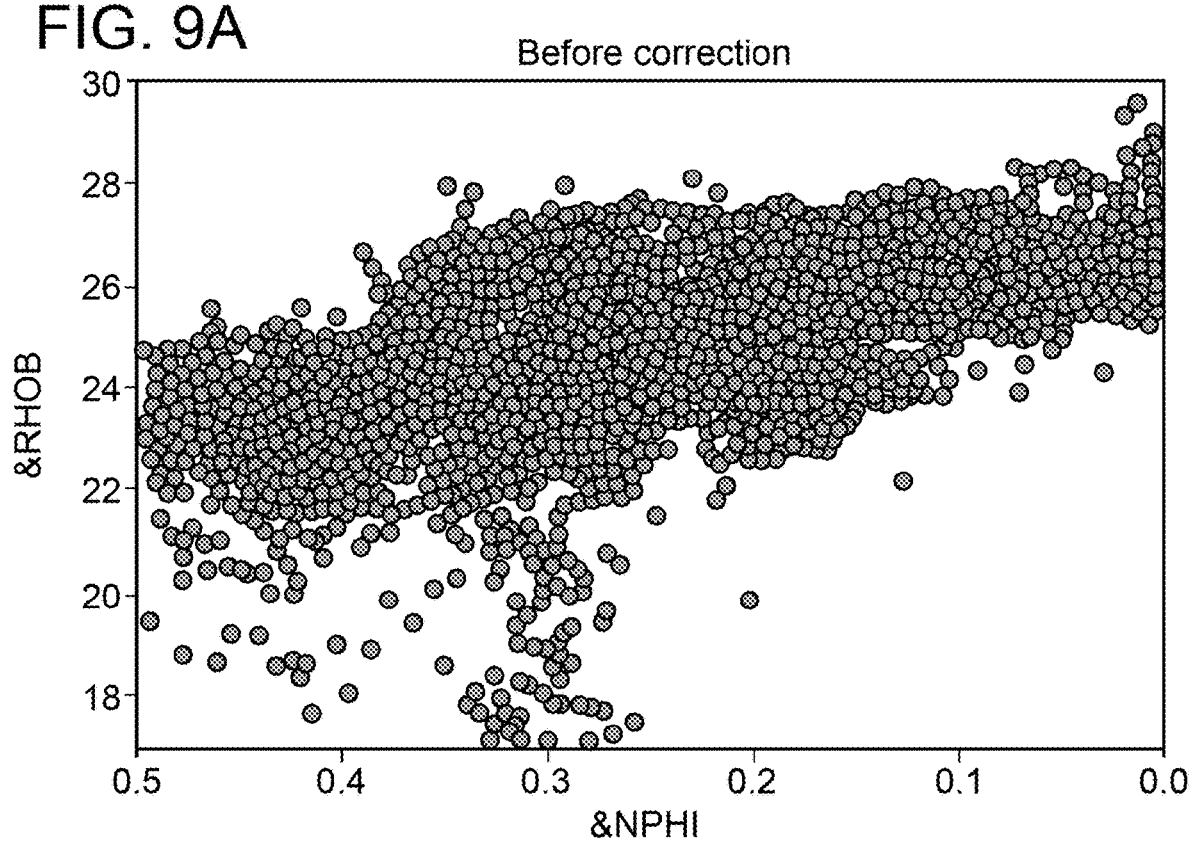
FIGS. 9A and 9B are neutron porosity versus bulk density cross-plot for a borehole using the original curves' values and the blended curves' values respectively.
Figure 9B:
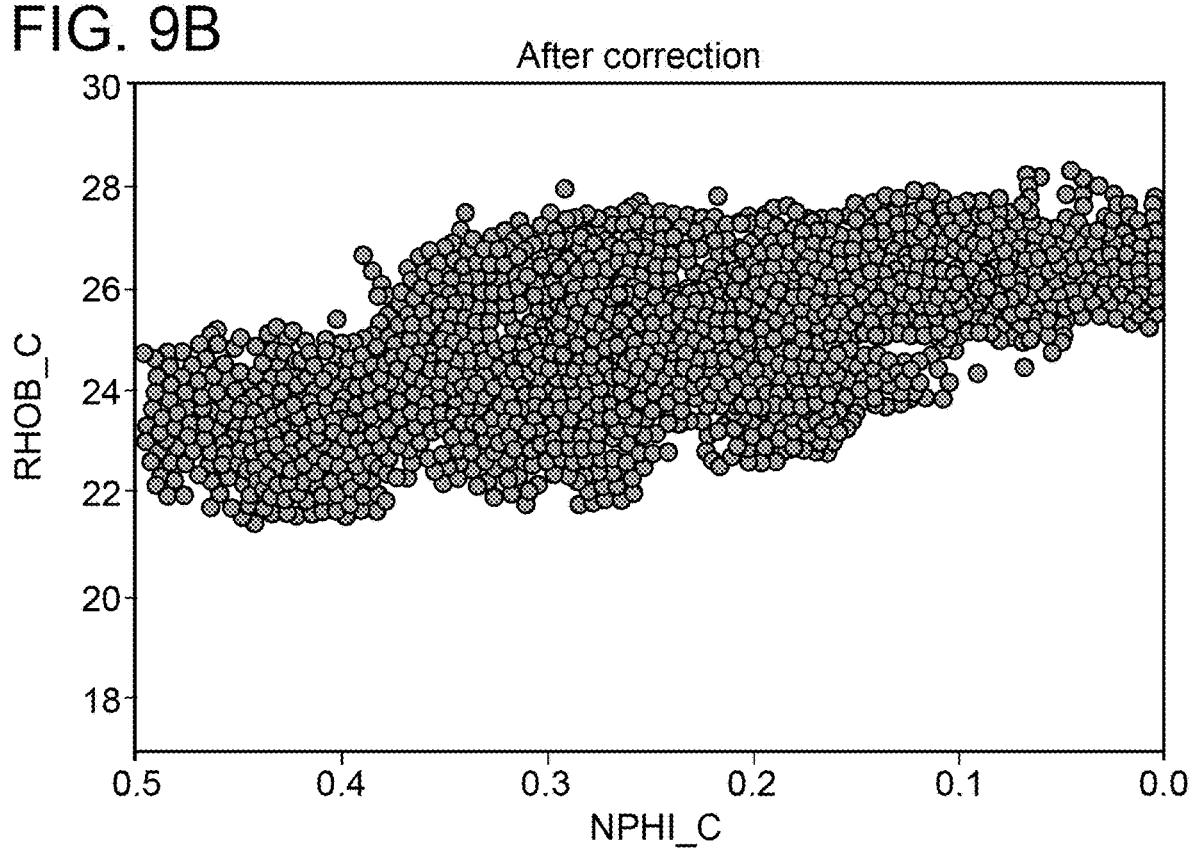

FIG. 8 illustrates implementations of depth-blending (i.e., step 114 of FIG. 1). For each log that requires correction (i.e., includes anomalies), a synthetic curve is blended into the original curve by replacing the anomalies in the original curve with synthetic curve values. Various techniques (some of which are described below as options) using the anomaly flag may be used individually or combined to generate the blended curve (i.e., "selective" depth-blending). According to a first option 801, if the flag indicates anomaly then the synthetic value replaces the value in the original curve; otherwise, the original curve value is maintained. According to a second option 803, a pay zone flag ("res_outlier") is generated to avoid using synthetic values in the blended curves over pay zones. A pay zone is a portion of the reservoir that can contain hydrocarbons.

In one embodiment, the pay zone flag values are determined using the resistivity curve's interquartile range cut-off: the pay zone flag is 0 if the resistivity value at a depth is not within middle (25-75%) values, and 1 if the resistivity value is within the middle values. Then, if the anomaly flag is 0 and the pay zone flag is 1, the synthetic value replaces the value in the original curve; otherwise, the original curve value is maintained. The resistivity curve typically has spikes in pay zones and/or wet zones. This second option ensures the original value is preserved if there is a resistivity outlier. Other methods may be used to generate the pay zone flag values, such as using values for lowest gamma ray readings (which are assumed to correspond to potential reservoir/pay zones. The pay zone flag methods have in common that a pay zone's original curve is not overwritten with a synthetic curve.

According to a third option 805, the outlier flag is smoothed to avoid shoulder effects, and a cut-off on the smoothed flag is applied when blending. If the flag is less than the cut-off on the smoothed flag, then the synthetic value replaces the value in the original curve; otherwise, the original curve value is maintained. The cut-off on the smoothed flag may be, e.g., 0.98 or 0.95.

FIG. 9A is a neutron porosity versus density cross-plot for a borehole using the original curves' values, and FIG. 9B is a neutron porosity versus bulk density cross-plot for the same borehole using the blended curves' values.

Figure 10:
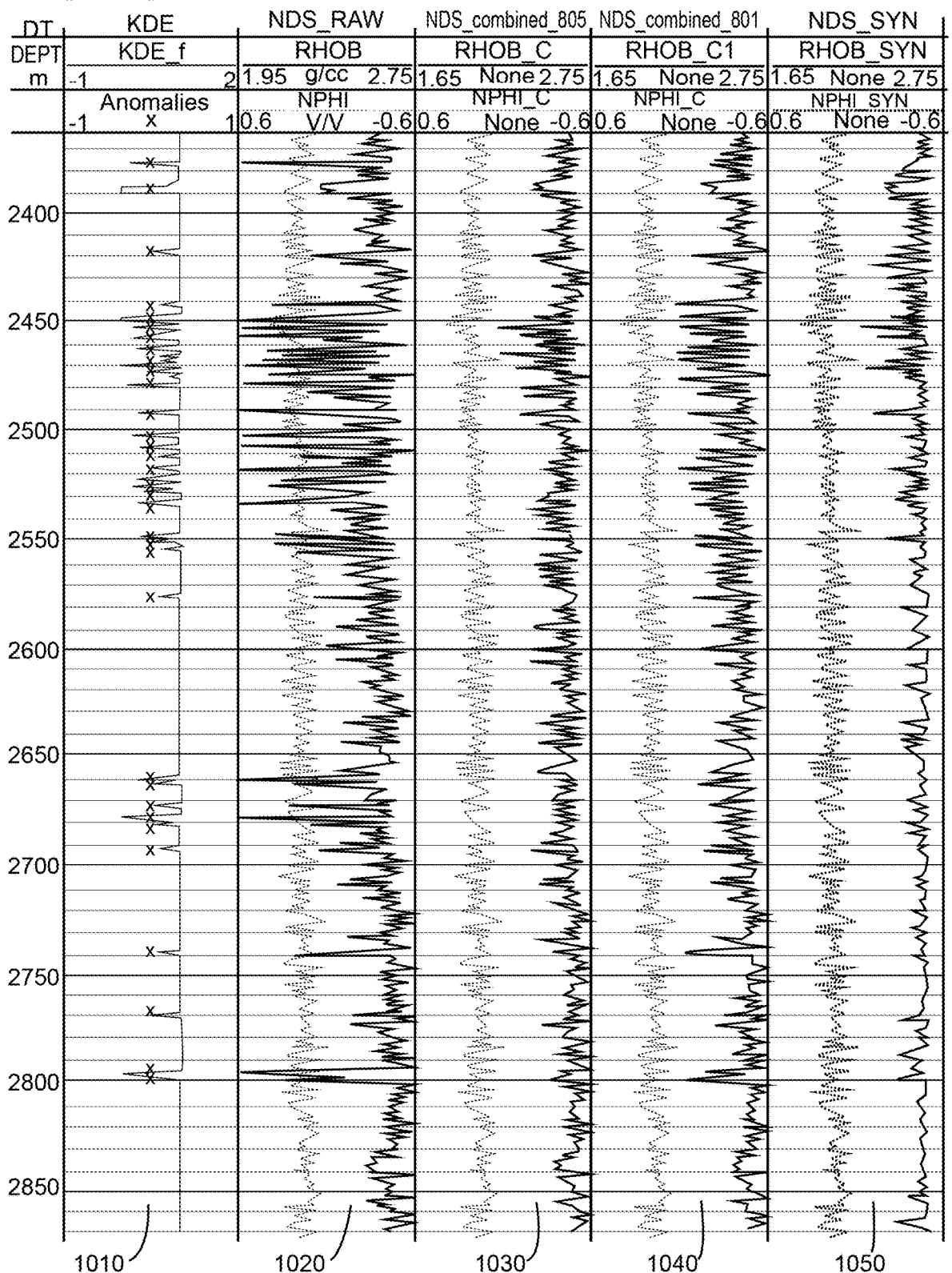
FIG. 10 is a log-plot example representing an anomaly flag, original density and neutron porosity curves, blended density and neutron porosity curves, and synthetic density and neutron porosity curves for a borehole.

FIG. 10 is a log plot with four sections (i.e., tracks having the same depth vertical coordinate). Section 1010 is the anomaly flag according to the outlier detection. Section 1020 represents the original density and neutron porosity curves. Section 1030 represents the blended logs obtained from the values of original and synthetic curves. Section 1040 represents the synthetic curves.

Figure 11:
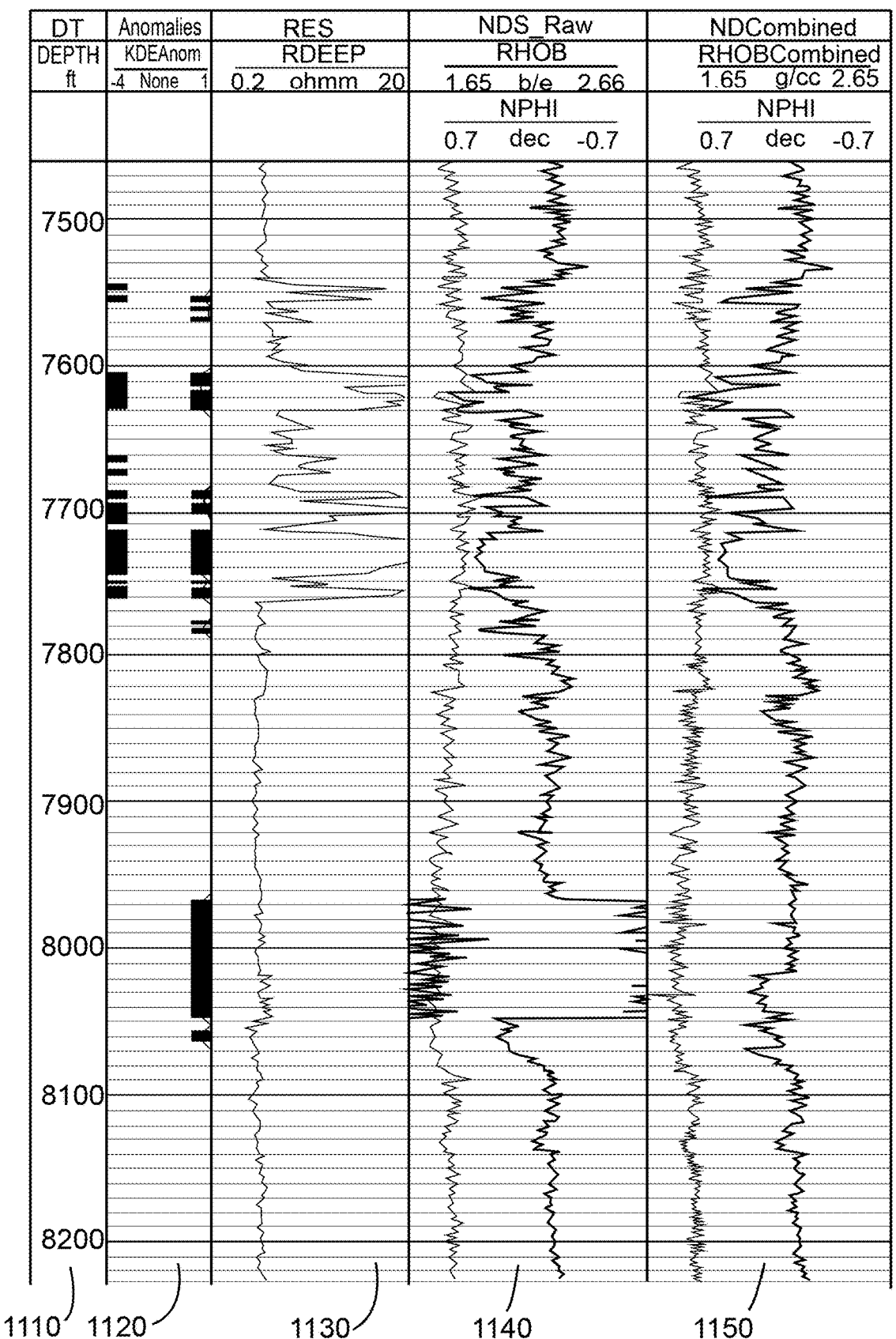
FIG. 11 is another log-plot example.

FIG. 11 is another log plot with five sections (with one or two tracks per section) illustrating pay-zone-aware corrections. The first track labeled DT represents the depth. The second section shows two flags: the one aligned with left margin is the resistivity outlier flag, and the one aligned with the right margin is the anomaly flag set using the anomaly detection ensemble. The third track is the resistivity curve. In the fourth section, there are two tracks: the lighter one represents uncorrected RHOB (density) curve and the darker one represents a Neutron curve (NPHI). In the fifth section, there are again two tracks: the lighter the synthetic blended density (RHOB_combined) and the Neutron curve (NPHI).

Between 7600 and 7800 ft there are a few pay zones indicated by the resistivity flag. Although this region is flagged for correction by the ensemble using the RHOB curve in section five, the pay zones are left untouched because the selective blending preserves the original values in the pay zone by also using the resistivity outliers. Between depths 7975 and 8100 ft, there is a large section of Bad RHOB that is corrected and indicated in section five.

The above-described methods may be used optionally for boreholes that are or are not wells (i.e., used for hydrocarbon production), or alternatively for mixtures of uncompleted boreholes and wells.

Figure 12:
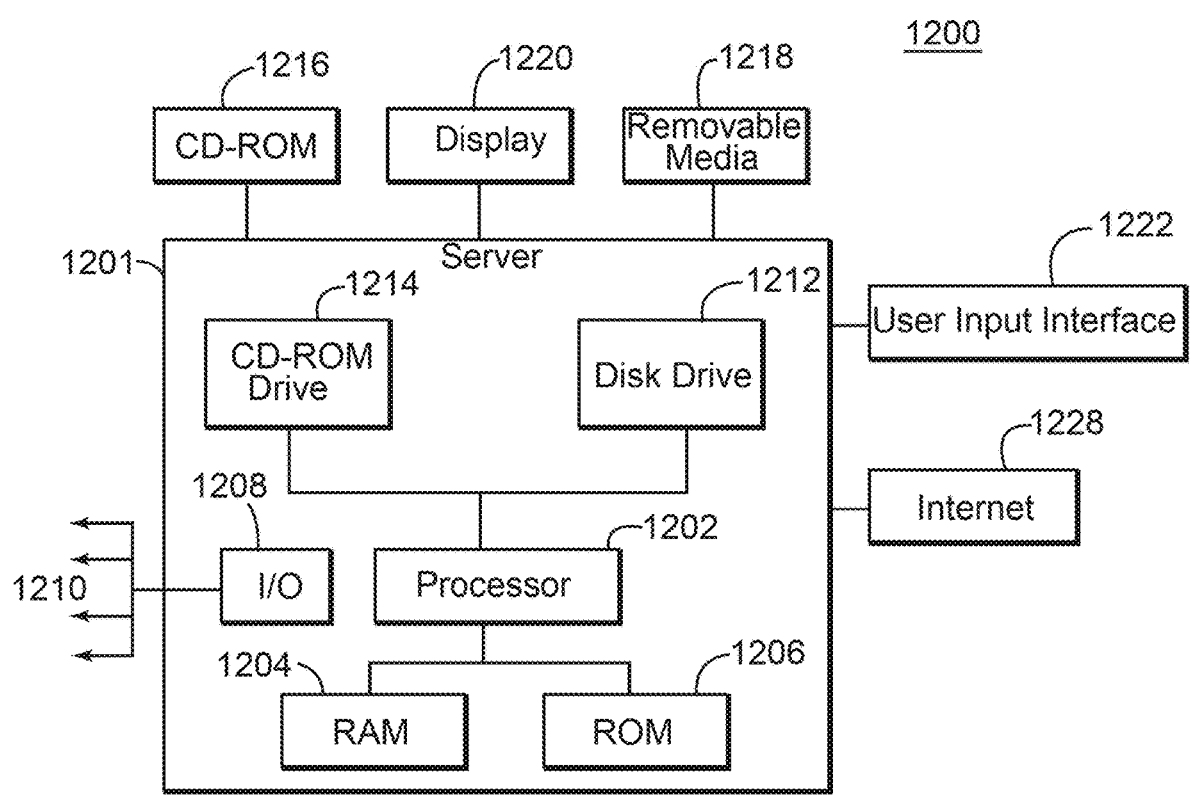
FIG. 12 is a schematic diagram of a log-data processing apparatus according to an embodiment.

The above-discussed methods may be implemented in a computing device 1200 as illustrated in FIG. 12. Hardware, firmware, software or a combination thereof may be used to perform the various steps and operations of methods described herein.

Exemplary computing device 1200 suitable for performing the activities described in the exemplary embodiments described in this section may include a server 1201. Server 1201 may include a central processor (CPU) 1202 coupled to a random access memory (RAM) 1204 and to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210 to provide control signals and the like. Processor 1202 carries out a variety of functions as are known in the art, as dictated by software and/or firmware instructions.

Server 1201 may also include one or more data storage devices, including hard drives 1212, CD-ROM drives 1214 and other hardware capable of reading and/or storing information, such as DVD, etc. In one embodiment, software for carrying out the above-discussed steps may be stored and distributed on a CD-ROM or DVD 1216, a USB storage device 1218 or other form of media capable of portably storing information. These storage media may be inserted into, and read by, devices such as CD-ROM drive 1214, disk drive 1212, etc. Server 1201 may be coupled to a display 1220, which may be any type of known display or presentation screen, such as LCD, plasma display, cathode ray tube (CRT), etc. A user input interface 1222 is provided, including one or more user interface mechanisms such as a mouse, keyboard, microphone, touchpad, touch screen, voice-recognition system, etc.

Server 1201 may be coupled to other devices, such as sources, detectors, etc. The server may be part of a larger network configuration as in a global area network (GAN) such as the Internet 1228, which allows ultimate connection to various computing devices.

The above-described approach yields superior results relative to Akkurt's approach because, after outlier detection, the bad hole points are reconstructed and the curve is patched at the outlier depths. When patching the curves, pay zones are not patched in the depth-blending process. Additionally, Akkurt's similarity analysis seems to ignore the outlier points, while embodiments set forth above use the entire curves for similarity analysis. Moreover, some embodiments described above use isolation forest to build the underlying model, not a one-class support vector machine (SVM) as in Akkurt and use hierarchical clustering on similarity scores to group the results. Some embodiments also calculate intersection-over-union similarity score besides Jaccard and overlap similarity scores.

Outlier detection may be performed using the anomaly detection ensemble that consists of isolation forest and DBScan. When optimal minPts for DBScan and contamination for isolation forest are automatically estimated, the best cut-off points for marking outliers are found.

Another difference from Akkurt's approach is that content information on other reservoir characteristics such as lithology and fluid content may be used besides bad hole detection outliers to enhance the analysis. Yet another difference is that the approach set forth in this document does not concentrate on specific curves; that is, any curves could be analyzed and reconstructed. Although the workflows are discussed based on a combination of neutron porosity and density with optionally other logs, the methods are not limited to this combination. Other log combinations can be used.

The blended log values may be used to guide inversions of seismic data, enabling a calibration of properties inverted from seismic data versus the ones measured or calculated from log data, thereby yielding a quantitative mapping of hydrocarbon reservoir properties and their surrounding formations.

FIG. 13 illustrates a geological exploration method 1300 according to an embodiment. Method 1300 includes obtaining measurements and calculating properties along boreholes in an area of interest to generate log data including plural curves at 1310. The measurements may include neutron porosity, density, and hole geometry besides one or more of a shallow and/or deep resistivity, sonic photoelectric, gamma ray and spontaneous potential. The calculated properties may include shale volume, water saturation, porosity, permeability, elasticity, and/or reflectivity coefficient.

The method then includes detecting anomalies along at least one curve of one of the boreholes at 1320. Step 1320 may encompass conformity checks 102, anomaly detection 104 and the associating of a flag value to each depth at 106 from FIG. 1.

Method 1300 further includes training a machine learning regressor using one or more curves without anomaly values of the one of the boreholes and/or of another similar borehole among the boreholes, to predict a synthetic curve corresponding to the at least one curve at 1330. This step may encompass the grouping 108, training 110 and predicting 112 also from FIG. 1.

Last but not least, method 1300 includes blending the synthetic curve into the at least one curve at 1340. The options described relative to FIG. 8 may be used. If the anomalies were flagged, the blending step may include replacing the flagged anomalies with values on the synthetic curve. The blending may use a pay zone flag in addition to an anomaly flag associated to each detected anomaly, the values of the pay zone flag being determined using a resistivity curve's interquartile range cut off.

As already discussed, the anomalies may be detected using an isolation forest technique (with contamination value an empirical value determined by applying IQR to differential caliper measurements, or by applying an elbow-plot variance method to a number of outliers versus contamination value plot), using DBScan (with predetermined eps and minPts parameters or predetermined eps and minPts parameter determined by applying an elbow-plot variance method to a number of outliers versus minPts plot), using an IQR or using an ensemble of methods including at least one of isolation forest, DBScan and IQR.

Further, the corrected log curves may be used in a seismic inversion. That is, an inversion applied to seismic data acquired over the area of interest to generate a three-dimensional (3D) image of an underground formation underneath is calibrated using the blended curves of the measurements and/or properties along one or more of the boreholes in the area of interest. Here, the 3D image should be understood as referring to various models, parameters and properties representing the physical reality of the underground formation. Hydrocarbon extraction may be planned based on reservoir characterization provided by the 3D image. Extracting hydrocarbon (e.g., oil and gas) would then according to the planning.

The seismic data processing benefit from blended well log curves in (1) generation of seismic synthetics and (2) quality check (QC) of seismic inversion results (seismic inversion transforms seismic data from reflection events to layer based properties which more accurately represent subsurface geology). The generation of seismic synthetics can be used to calibrate and check seismic processing workflows by comparing to well logs with seismic synthetics, to validate well logs by comparing to measured seismic, and/or to make decisions for new well locations by searching for seismic in survey area which match desired synthetic intervals. In QC, blended well log curves can be used for fluid replacement modeling, in order to generate synthetic seismic to model different fluid effects, and/or QC of seismic inversion results (seismic inversion transforms seismic data from reflection events to layer based properties which more accurately represent subsurface geology). Comparison of well logs to inverted volumes enables QC of inversion results. Accurate well logs are required to generate the low frequency model, which is a required input of seismic inversion.

Thus, the various embodiments provide better pore pressure predictions due to more accurate overburden stress calculations, better quality facies classification results (both supervised and unsupervised), save time spent on data quality control (as it is automated and more accurate), and yield better quality seismic synthetics.

The disclosed embodiments provide methods for automatically detecting and correcting anomalies in log data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A geological exploration method comprising:
   obtaining measurements and calculating property values associated with depth values along boreholes in an area of interest to generate log data including plural curves;
   detecting anomalies along at least one curve among the plural curves, the at least one curve corresponding to a first borehole among of the boreholes;
   training a machine learning regressor using the at least one curve without anomaly values and/or another curve among the plural curves, the other curve corresponding to a second borehole among the boreholes, the second borehole being similar with the first borehole, to predict a synthetic curve corresponding to the at least one curve;
   blending the synthetic curve into the at least one curve to obtain a blended curve;
   obtaining seismic data for the area of interest; and
   applying an inversion method to the seismic data to generate a three-dimensional image of underground formation in the area of interest, the inversion method being calibrated using the blended curve, the three-dimensional image being usable to plan hydrocarbon extraction.

2. The method of claim 1, further comprising:
   flagging the anomalies detected along the at least one curve,
   wherein the blending includes replacing the flagged anomalies with values on the synthetic curve.

3. The method of claim 1, wherein the anomalies are detected using an ensemble of methods including at least one of an isolation forest method, a density-based spatial clustering method and an interquartile range technique.

4. The method of claim 1, wherein the anomalies are detected using an isolation forest technique.

5. The method of claim 4, wherein a contamination value used by the isolation forest method is determined by applying an interquartile range technique to differential caliper measurements.

6. The method of claim 4, wherein a contamination value used by the isolation forest method is determined by applying an elbow-plot variance method to a number of outliers versus contamination value plot.

7. The method of claim 1, wherein the anomaly detection uses a density-based spatial clustering method (DBScan).

8. The method of claim 7, wherein values of eps and minPts parameters used by DBScan are predetermined.

9. The method of claim 7, wherein a value of eps parameter used by DBScan is predetermined, and a value of minPts parameter used by DBScan is determined by applying an elbow-plot variance method to a number of outliers versus minPts value plot.

10. The method of claim 1, wherein the anomaly detection uses an interquartile range technique.

11. The method of claim 1, wherein the blending uses a pay zone flag in addition to an anomaly flag associated to each detected anomaly, wherein values of the anomaly flag are determined using a resistivity curve's interquartile range cut off,
and the pay zone flag is set for lowest gamma ray values or determined using values of a curve other than the at least one curve.

12. The method of claim 1, wherein the measurements include neutron porosity, density, and hole geometry besides one or more of a shallow and/or deep resistivity, sonic photoelectric, gamma ray and spontaneous potential.

13. The method of claim 1, wherein the calculated properties include one or more of shale volume, water saturation, porosity, permeability, elasticity, reflectivity coefficient.

14. The method of claim 1, further comprising:
planning hydrocarbon extraction based on reservoir characterization provided by the three-dimensional image; and
extracting hydrocarbon according to the planning.

15. An underground exploration apparatus comprising:
an interface configured to obtain measurements and to calculate property values associated with depth values along boreholes in an area of interest to generate log data including plural curves, and to obtain seismic data for the area of interest; and
a data processing module connected to the interface, including at least one processor and configured
to detect anomalies along at least one curve among the plural curves, the at least one curve corresponding to a first borehole among the boreholes,
to train a machine learning regressor using the at least one curve without anomaly values and/or another curve among the plural curves, the other curve corresponding to a second borehole among the boreholes, the second borehole being similar with the first borehole, to predict a synthetic curve corresponding to the at least one curve,
to blend the synthetic curve into the at least one curve to obtain a blended curve, and
to apply an inversion method to the seismic data to generate a three-dimensional image of underground formation in the area of interest, wherein the inversion method is calibrated using the blended curve, the three-dimensional image being usable to plan hydrocarbon extraction.

16. The underground exploration apparatus of claim 15, wherein the data processing module is further configured to flag the anomalies detected along the at least one curve, and when blending the synthetic curve into the at least one curve to replace the flagged anomalies with values on the synthetic curve.

17. The underground exploration apparatus of claim 15, wherein the data processing module detects the anomalies using an isolation forest method, a density-based spatial clustering (DBScan) method, an interquartile range (IQR) technique or an ensemble of methods including at least one of the isolation forest method, the DBScan method and the IQR technique.

18. The underground exploration apparatus of claim 15, wherein the data processing module uses a pay zone flag in addition to an anomaly flag associated to each detected anomaly for blending the synthetic curve into the at least one curve, wherein values of the anomaly zone flag are determined using a resistivity curve's interquartile range cut off, and the pay zone flag is set for lowest gamma ray values or determined using values of a curve other than the at least one curve.

19. The underground exploration apparatus of claim 15, wherein
the measurements include neutron porosity, density, and hole geometry besides one or more of a shallow and/or deep resistivity, sonic photoelectric, gamma ray and spontaneous potential, and/or
the calculated properties include one or more of shale volume, water saturation, porosity, permeability, elasticity, reflectivity coefficient.

20. The underground exploration apparatus of claim 15, wherein
the data processing module is further configured
to generate a plan of hydrocarbon extraction from the underground formation based on reservoir characterization provided by the three-dimensional image.

* * * * *